(12) United States Patent  
Hung (10) Patent No.: US 7,154,634 B2  
(45) Date of Patent: Dec. 26, 2006

(54) CALIBRATION METHOD, CALIBRATION APPARATUS, AND MEMORY MEDIUM STORING THE CALIBRATION METHOD OF PRINTER

(75) Inventor: Po-Chieh Hung, Tokyo (JP)

(73) Assignee: Konica Corporation, Tokyo (JP)

( * ) Notice: Subject to any disclaimer, the term of this patent is extended or adjusted under 35 U.S.C. 154(b) by 1004 days.

(21) Appl. No.: 10/153,375

(22) Filed: May 22, 2002

(65) Prior Publication Data

US 2002/0181018 A1 Dec. 5, 2002

(30) Foreign Application Priority Data

May 30, 2001 (JP) ............................. 2001-162562

(51) Int. Cl.
*G06F 15/00* (2006.01)
(52) U.S. Cl. .................. 358/1.9; 358/2.1; 358/1.16; 358/504
(58) Field of Classification Search ............ 358/2.1, 358/1.16, 504, 523, 530, 406, 505, 1.9
See application file for complete search history.

(56) References Cited

U.S. PATENT DOCUMENTS

| | | | | |
|---|---|---|---|---|
| 5,838,465 | A * | 11/1998 | Satou et al. ............ | 358/520 |
| 6,717,674 | B1 * | 4/2004 | Ohkubo .................. | 356/421 |
| 6,943,917 | B1 * | 9/2005 | Tamagawa ............... | 358/1.9 |
| 2002/0051159 | A1 * | 5/2002 | Tamagawa ............... | 358/1.9 |
| 2003/0043167 | A1 * | 3/2003 | Hoshino .................. | 345/589 |
| 2004/0184658 | A1 * | 9/2004 | Inoue ...................... | 382/162 |
| 2004/0264773 | A1 * | 12/2004 | Doumoto et al. ........ | 382/167 |
| 2005/0024658 | A1 * | 2/2005 | Ota et al. ................. | 358/1.9 |
| 2005/0190390 | A1 * | 9/2005 | Yamada et al. .......... | 358/1.9 |
| 2005/0225784 | A1 * | 10/2005 | Jacob et al. ............. | 358/1.9 |
| 2006/0072170 | A1 * | 4/2006 | Kawakami et al. ...... | 358/504 |

FOREIGN PATENT DOCUMENTS

| | | | |
|---|---|---|---|
| EP | 0398502 A2 | * | 11/1990 |
| EP | 0674429 A2 | * | 9/1995 |
| JP | 02-086388 | | 3/1990 |
| JP | 02-136848 | | 5/1990 |
| JP | 02-226870 | | 9/1990 |
| JP | 02000134495 A | * | 5/2000 |
| JP | 2002-094824 | | 3/2002 |

* cited by examiner

*Primary Examiner*—Jerome Grant, II  
(74) *Attorney, Agent, or Firm*—Frishauf, Holtz, Goodman & Chick, P.C.

(57) ABSTRACT

A calibration method of a printer includes forming characterization data using first colorimetric data obtained from a first set of color patches outputted from the printer, and forming calibration data using second colorimetric data obtained from a second set of color patches, which is smaller in number than the first set of color patches. A color matching table is formed based on the characterization data and the calibration data. And color image data is converted based on the color matching table.

5 Claims, 6 Drawing Sheets

REPRODUCED COLOR (OUTPUT)

TARGET COLOR (INPUT)

CALIBRATION METHOD, CALIBRATION APPARATUS, AND MEMORY MEDIUM STORING THE CALIBRATION METHOD OF PRINTER

BACKGROUND OF THE INVENTION

The present invention relates to a calibration method, calibration apparatus, and memory medium storing the calibration method of a printer, and in further detail, relates to an improvement of a color reproduction method of the printer.

For example, in the color printer, the color reproduction is realized by the following method. FIGS. 5(a) to 5(d) are illustrations of the color reproduction method of the printer. In the drawings, FIG. 5(a) and FIG. 5(b) are illustrations of the conversion of the reproduction color (output), and FIG. 5(c) and 5(d) are illustrations of the conversion of the target color (input).

(1) By measuring many number of color patches, the relationship of a set of calorimetric values for the combination of the color material is made. Herein, the color material means the color material of Y, M, C, and BK etc.

Initially, the relevant printer is used and many color patches are printed. FIG. 5(a) shows the Y and M space expressed by 2 dimensions. Herein, the space of Y, M, C, (BK) is expressed by 2 dimensional Y and M spaces for the simplification. Values of lattice points in the Y direction and the M direction are respectively defined as 0, 64, 128, 192, 255 as shown in the drawing. These Y, M values of 5×5 lattice points are inputted into the printer, and color patches are made.

When the color patch printed by the combination of these Y and M is color-measured, the value of the colorimetry is obtained as the 3 stimulus values X, Y, and Z. The values obtained in this manner are converted into the other color system (for example, L*a*b*, L*u*v*). When these are plotted into the L*C* color system (uniform color space) in this manner, the space shown in FIG. 5(b) is formed. This space shows the proper space (color solid) to the using printer. Herein, L* is lightness, and C* is chroma. Herein, a, b, c, and d of the spaces of FIG. 5(a) correspond to a', b', c', and d' of FIG. 5(b). In this manner, to make the space of the color system (calorimetric value) from the Y, M spaces (color material) is called the characterization by the multi-dimensional LUT.

(2) Next, the combination of the color material amount (or system value) of the printer to the target color is obtained.

Next, also for the R, G, B spaces showing the target color, as shown in FIG. 5(c), the same kind of space (color solid) as the case of FIG. 5(a) is made. Herein, for the simplification, the spaces of G and B are made. Also for the combination of G, B which is a color material herein, the lattice points of the space of 5×5 are found, and when the values of lattice points of these spaces are plotted in the color system, the color solid space as shown in FIG. 5(d) is obtained.

When the L*C* space as shown in FIG. 5(d) is formed, the target color is determined by using FIG. 5(c). The target color is defined as m1 as shown in FIG. 5(c). The corresponding area of the space shown in FIG. 5(d) corresponding to this m1 is obtained, and the point m1' in its corresponding area is obtained.

After m1' is obtained, the point m1" which is corresponding to m1' in the L*C* space of the reproduction color system is obtained. When the point m1" is obtained, the corresponding point m1''' in the Y, M spaces of the reproduction color system in FIG. 5(a) is obtained. In this manner, when the reproduction color is obtained from the target color, since the relationship of the reproduction color to the target color is determined, the conversion table (color conversion LUT) of G, B→Y, M is made. These color conversion tables are made by the number of target colors. According to this process, when the target color is given by G, B, the reproduction color is given by M and Y.

In this manner, to obtain the combination of the color material (or system value) of the printer corresponding to the target color, is called the color matching.

(3) Next, the step of (2) is repeated, and the table (color conversion LUT) showing the relationship of the color material (or system value) of the printer to each combination of the input signal is made.

(4) By using the color conversion LUT (color matching table) made in this manner, the image data is printed by the printer.

When such a series of the sequence is conducted, the correct image can be printed by the printer such that the relationship of the reproduction color to the target color is exactly represented. By this method, even when there is a deviation in the color conversion characteristics of each of printers, in the process to plot in the L*C* space shown in FIG. 5(a) to FIG. 5(b), the individual difference of each printer is removed, and the image of the correct reproduction color can be printed without depending on the printer individual.

As the reference art relating to the above described color conversion, the following are well known. Japanese patent No. 2895086: In the calculation method of above (2), the space is divided into triangular pyramids and the target color material value is obtained at high speed.

Japanese patent No. 2554366: In the four-color printer, as black is increased, the color patches subjected to the colorimetry are decreased.

Japanese patent No. 2952489: By using black at the maximum in the four-color printer, the colorimetry points are decreased (maximum black method).

Japanese patent application No. 2000-281161: the color reproduction method of the special color. The color data is divided into a plurality of 4 dimensional color areas and the color is structured.

Figure 6:
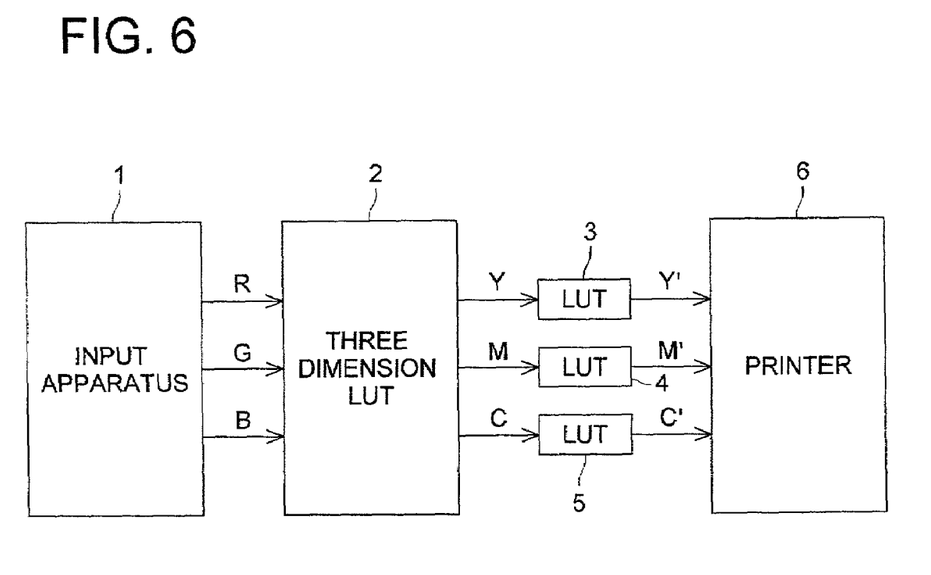
FIG. 6 is a conceptual view of the color reproduction system.

When the printer characteristic is varied, a method to correct only the gradation curve is well known. FIG. 6 is a conceptual view of the color reproduction system. When the data of R, G, B are outputted from the input device 1, they enter into the 3 dimensional LUT 2, and the conversion from the R, G, B system to the Y, M, C system is conducted. For the output of each of Y, M, C, the LUT 3—LUT 5 to conduct only the gradation conversion are provided. From each of LUT 3—LUT 5, the Y', M' and C' whose gradations are converted, are outputted, and they enter into the printer 6, and the image is printed.

Herein, when the printer is varied, the change is not added to the 3 dimensional LUT 2, and when only the gradation LUT 3—LUT 5 provided on the output side of each of Y, M, C are corrected, the influence by the variation of the printer is lightened. In the case where this method is used, when the primary color point is not changed, the general color reproduction can be obtained. Herein, the primary color point is the lattice points (a', b', c', d') of four corners of the color system shown in FIG. 5(b).

For example, in the ICC profile (International Color Consortium), the gradation can be corrected in the profile, and by using this, the correction of the profile can be conducted.

When the characterization is conducted in the LUT form shown in the method as described above, it is necessary that a numerous color patches are measured, and when the characteristic variation of the printer is generated, it is necessary that the whole are measured again.

Further, in the case where the correction to the characteristic variation of the printer is conducted by only the gradation curve, for example, when the maximum density is lowered, or media condition (for example, the printer sheet of the ink jet printer) is changed, the calorimetric value of the primary color is changed, and there is a problem that the correct color is not reproduced. Particularly, in the print onto the cloth, for the purpose of the industrial use, which needs to output the color in the absolute value (for example, L*a*b* value), such a problem is not allowed. Therefore, it is necessary to measure again, and particularly, it takes a long period of time for the colorimetry.

For example, it is necessary that the color is measured for (5×5×5=125) points in the 3-color printer, (5×5×5+5×5×5+3×3×3+3×3×3+2×2×2=312) points in the 4-color printer, and for the 7-color hifi color, the color measuring is necessary for the color patches of 4 times of it. In this connection, the number of measurement shown herein is an example. Further, when the medium is the paper, it can be automatically measured by the calorimeter with the xy stage (the calorimeter which can automatically move in the xy direction), however, for the cloth, such an automatic measurement is difficult, and the manual measurement is necessary.

In view of such a problem, the present invention is attained, and the object of the present invention is to provide a calibration method, a calibration apparatus, and a memory medium storing the calibration method of the multi-color printer, wherein the variation of the printer (media) is absorbed by the minimum additional colorimetry and correct color reproduction can be performed.

BRIEF DESCRIPTION OF THE DRAWINGS

FIG. 5(a) to FIG. 5(d) are illustrations of a color reproduction method of a printer.

SUMMARY OF THE INVENTION

The above problems can be solved by the following structures.
(1) A calibration method of a printer, having steps of: forming characterization data using first colorimetric data obtained from a first set of color patches outputted from the printer; forming calibration data using second calorimetric data obtained from a second set of color patches having a smaller number of color patches than the first set of color patches; forming a color matching table based on the characterization data and the calibration data; and converting color image data based on the color matching table.

When it is structured as described above, by a small number of colorimetry measuring points, without conducting the large number of colorimetry measuring, the variation error due to the variation of the primary color points can be effectively corrected.
(2) The second structure is characterized in that: the color patches to be used for the calibration is a sub-set of the color patches used for the characterization.

Herein, the sub-set means a set in which the number of color patches of the color patch set is thinned out and reduced. When structured as described above, since, for the colorimetry measuring point, the calibration data can be used as it is, the error is reduced.
(3) The third structure is characterized in that: the above process is conducted when the ink or medium of the printer is changed.

When structured as described above, by conducting the color calibration when necessary, the working burden of the user can be lightened.
(4) The fourth structure is characterized in that: the medium printed by the above printer is the cloth.

When structured as described above, although, in the print onto the cloth, the color is varied due to the various factors, this color variation can be effectively corrected.
(5) The fifth structure is an apparatus, wherein the characterization data formed based on the data of the first set of color patches is corrected based on the data of the second set of color patches, and the color matching table is calculated based on the corrected characterization data, wherein the number of color patches in the second set is smaller than that in the first set of color patches.

When structured as described above, by a small number of colorimetry points, without conducting a large number of colorimetry, the variation error due to the variation of the primary color points can be effectively corrected.
(6) The sixth structure is a memory medium storing a process, wherein the characterization data formed based on the data of the first set of color patches is corrected based on the data of the second set of color patches, and the color matching table is calculated based on the corrected characterization data, wherein the number of color patches in the second set is smaller than that in the first set of color patches.

When structured as described above, the memory medium in which the sequence conducting the color calibration is stored can be provided, and the hardware amount can be reduced.

DETAILED DESCRIPTION OF THE PREFERRED EMBODIMENT

Referring to the drawings, an embodiment of the present invention will be detailed below.

Figure 1:
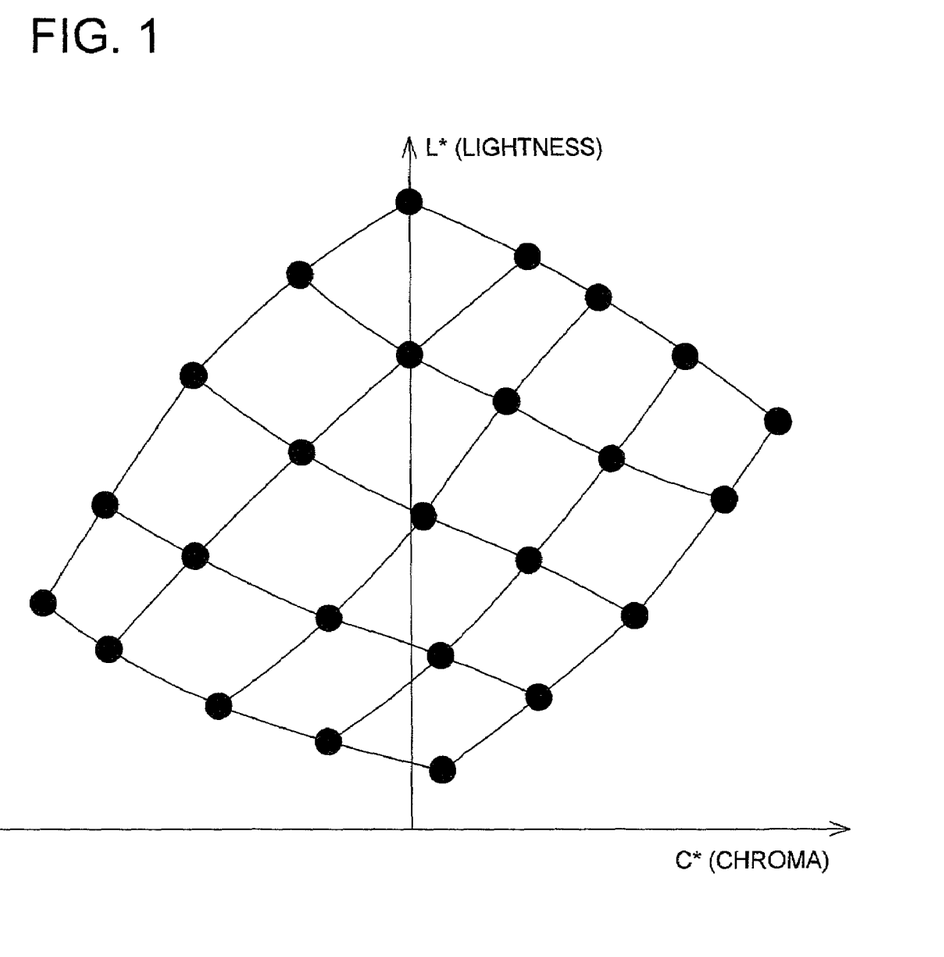
FIG. 1 is a view showing a characterization colorimetry result.
Figure 5:
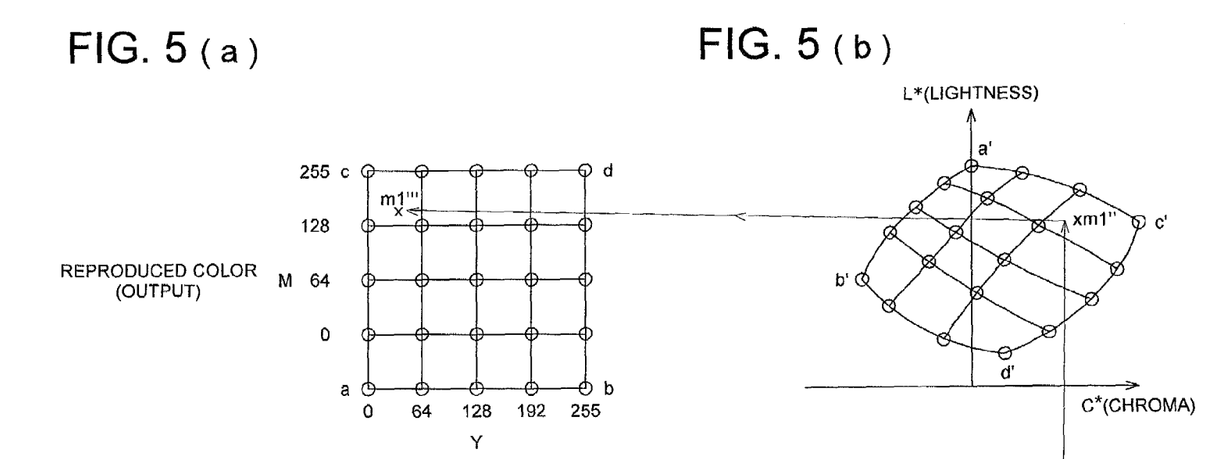

FIG. 1 is a view showing the colorimetry result of the characterization. In this drawing, as shown in FIG. 5, the input signals are divided into 5 steps of each signal of Y, M, C and printed out, color patches are made, and those are plotted on the LCC space. The horizontal axis is the C* (chroma), and the vertical axis is the L* (lightness). Herein, for the simplification, it is shown by 2 dimensional display. In this case, the number of colorimetry points is 125 points of 5×5×5.

In the initial characterization, because it has the characteristic shown in FIG. 1, from this characteristic, by using the above reference technology (description of FIG. 5), the color reproduction LUT can be made.

However, in the actual device, the characteristic variation is generated. When the primary color point (the coordinates of lattice point 4 corners of the characteristic shown in FIG.

1) is stable, as shown in FIG. 6, only by correcting the gradation curve, the color reproduction can be realized corresponding to the variation of the printer.

Figure 2:
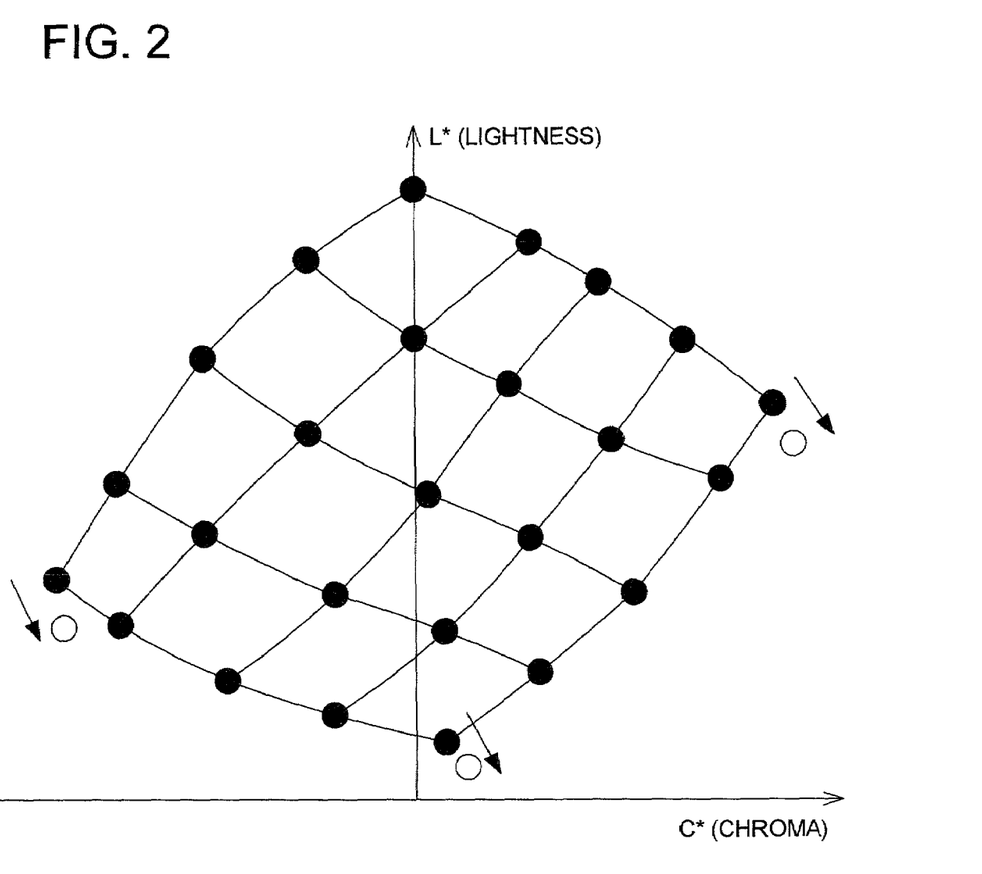
FIG. 2 is an illustration of the movement of a primary color point due to the variation of the media etc.

However, when the primary color point is dislocated as shown in FIG. 2, it cannot be corrected by only the correction of the gradation characteristic. FIG. 2 shows a case where the primary color point is dislocated due to the variation of media and the like as shown by ○. The white of the point on the L* axis is defined that it is not dislocated. The primary color point is defined that it is dislocated in the arrowed direction as shown in the drawing.

Figure 3:
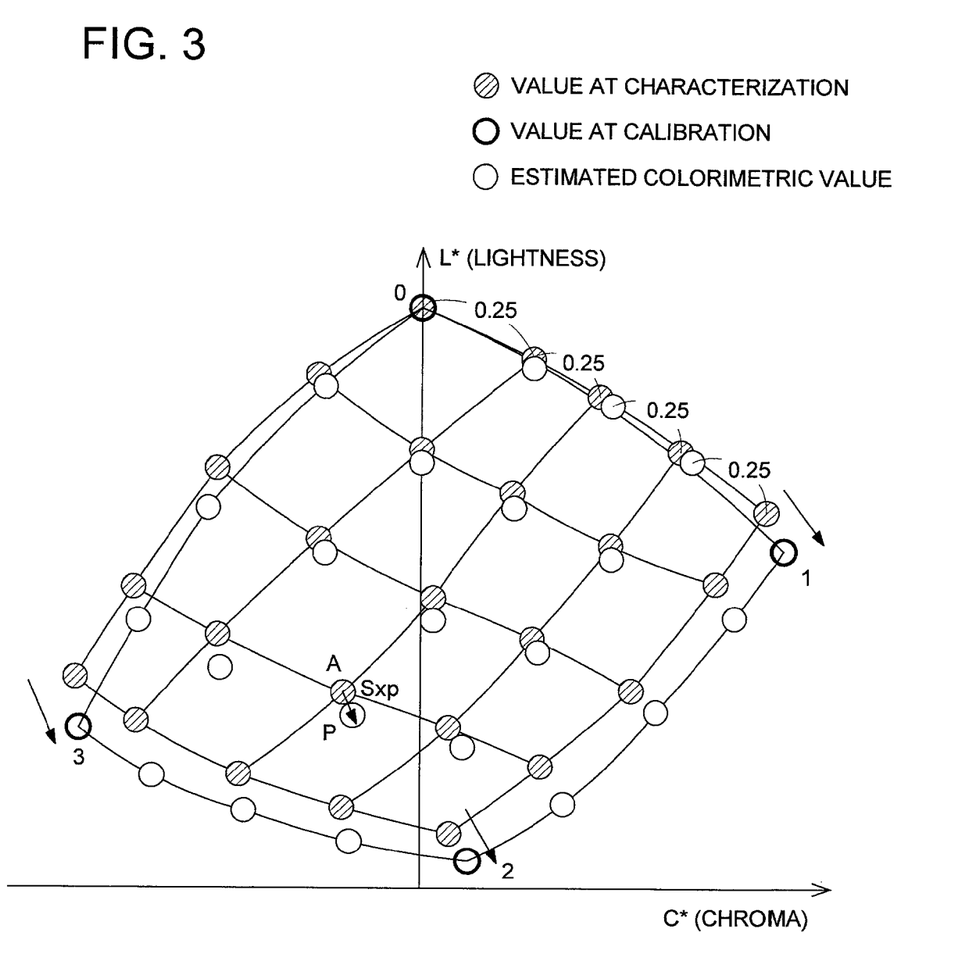
FIG. 3 is a view showing a calibration colorimetry result of the present invention.

Accordingly, in the machine (printer) whose characteristic is dislocated, the colorimetry point used in the characterization is thinned out and the colorimetry is conducted. This result is shown in FIG. 3. In the drawing, the circle shown by hatching is the characteristic at the time of the characterization, and bold ○ is the characteristic at the time of calibration. ○ is the chromatic value estimated from both of them. In the example shown herein, with 2 steps of each color, only 8 points of 2×2×2 are measured. It is also no problem even when, with 3 steps of each color, 3×3×3=27 points are measured. In this case, although the data of the intermediate point is missed, by using the characteristic data used for the original characterization, it is estimated.

The estimation method will be described below. Initially, from the deviation between the data (original data) at the time of characterization and the data at the time of calibration, the interpolation is conducted and the deviation of other lattice point is estimated. As the interpolation method, the method by using the weighted mean from the peripheral points is adopted herein.

Herein, Sx shows the dislocation value in the x axis direction between the value of the characterization and the calibration value. The point P shown in FIG. 3 shows the point after dislocated, and the dislocation from the original point is Sxp. Vi is a volume of the rectangular parallelepiped which is formed on the opposite side of the point to be obtained, to the apex of the cube measured by the calibration. $Cal_{xi}$ is the result measured at the time of the calibration, and $Cha_{xi}$ is the result measured at the time of the characterization. The deviation Sxp and the new point position $New_{xp}$ are respectively expressed by the following expressions. Herein, p is an arbitrary point.

$$Sxp = \frac{1}{\sum_{i=0}^{7} vi} \sum_{i=0}^{7} vi(Calxi - Chaxi) \quad (1)$$

$$New_{xp} = Cha_{xp} + Sxp \quad (2)$$

Expression (1) shows the deviation Sxp from the point A in FIG. 3 to movement point P and shows that the new position $New_{xp}$ of the point P is obtained by adding the deviation Sxp to the position $Cha_{xp}$ of the point A measured at the time of the characterization.

For example, the case of the point P in FIG. 3 will be considered. Herein, because it is the second dimension, the case where it is surrounded by the quadrangle will be described. In the case of the three dimension, it is 8 points. When the primary lattice interval at the time of the calibration is 1, each lattice interval is 0.25 at minimum, and at 2 times of it, 0.5, and at 3 times of it, 0.75 (refer to FIG. 3).

Expression (1) becomes as follows.

$$Sxp=0.5 \cdot 0.25(Cal_{L*0}-Cha_{L*0})+0.5 \cdot 0.25(Cal_{L*1}-Cha_{L*1})+0.5 \cdot 0.75(Cal_{L*2}-Cha_{L*2})+0.5 \cdot 0.75(Cal_{L*3}-Cha_{L*3}) \quad (3)$$

$$New_{L*P}=Cha_{L*P}+S_{L*P} \quad (4)$$

When the sequence as described above is repeated by the necessary numbers, the chromatic value can be estimated from the measured value at the time of the characterization and the measured value at the time of calibration. The estimated color system is the new characteristic curve of the color system same kind as in FIG. 1. From the color system estimated in this manner, the color matching calculation is conducted by using the method described in FIG. 5, and the color conversion LUT (color matching table) is made, and can be used for the printer.

In this manner, according to the present invention, the characterization data formed based on the data of the first set of color patches is corrected based on the data of the second set of color patches, and the color matching table is calculated based on the corrected characterization data, wherein the number of color patches in the second set is smaller than that in the first set of color patches, and the large number of colorimetry are not conducted, and the variation error due to the variation of the primary color points can be effectively calibrated by a small number of colorimetry points. Further, according to the present invention, the color patches used for the calibration are the sub-set of the color patches used for the characterization. That is, at the time of the calibration, because the measuring points used at the time of the characterization are thinned out and measured, for the colorimtery point, because the calibration data can be used as it is, the error is reduced.

It is preferable that the present invention is conducted when the ink or medium of the printer is changed. In the case where structured in this manner, when the color calibration is conducted at need, the working burden on the user can be lightened.

In this connection, not only the above interpolation method, but the other interpolation (for example, the triangular pyramid interpolation, or the tetrahedral interpolation) can also be used. Further, in the case of 4 colors, the apex numbers used for the interpolation calculation are more than 5 points (in the case of the super triangular pyramid interpolation).

Figure 4:
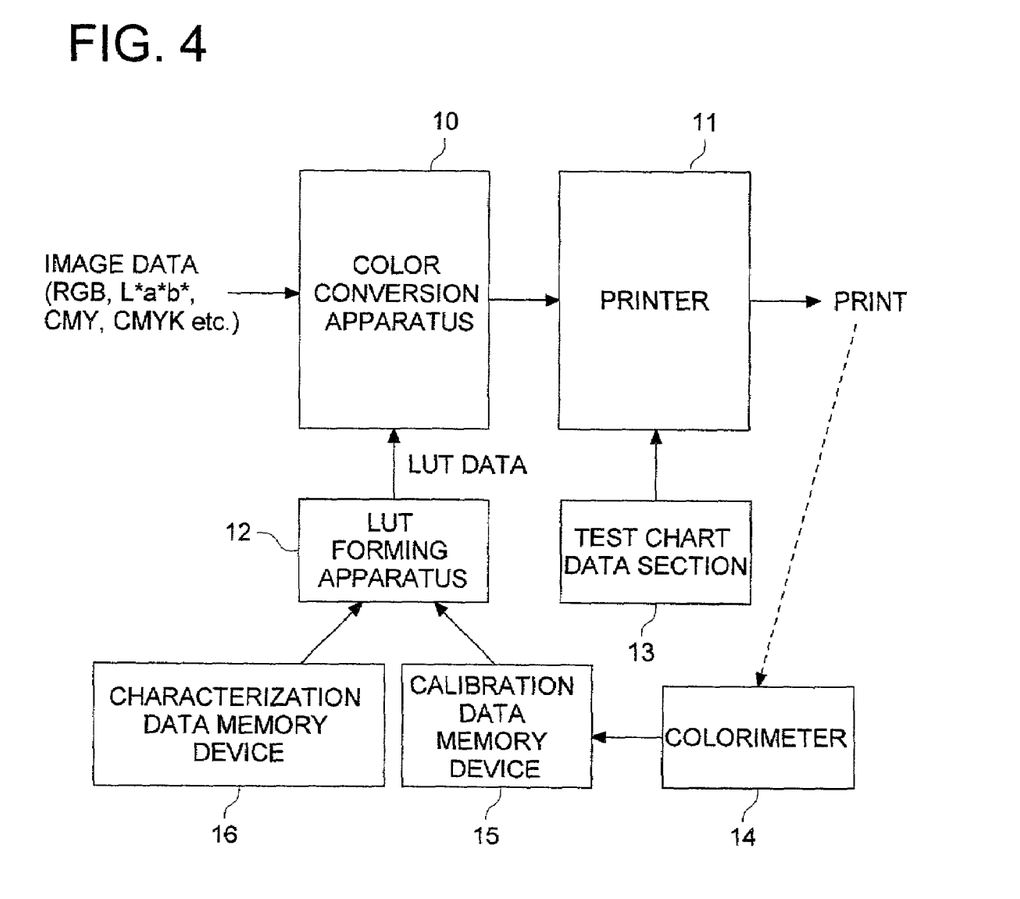
FIG. 4 is a block diagram showing an embodiment of the present invention.

FIG. 4 is a block diagram showing one embodiment of the present invention. In the drawing, numeral 10 is a color conversion apparatus to conduct the color conversion with respect to the input image data (for example, RGB, L*a*b*, CMY, CMYK), and numeral 11 is a printer section by which the color converted image data is inputted and the image is printed. Numeral 12 is the LUT forming apparatus for making the LUT, and numeral 13 is a test chart data section for giving the test chart data to the printer section.

Numeral 14 is a colorimeter for measuring the color of the color patch printed by the printer section 11. Numeral 15 is a calibration data memory device for storing the calibration data based on the colorimetry data from the calorimeter 14, and numeral 16 is a characterization data memory device for storing the characterization data. The data read from the calibration data memory device 15 and the characterization data memory device 16 enter into the LUT forming apparatus 12. When the operation of thus structured apparatus is described, it is as follows.

(The Making Operation of the Color Conversion LUT)

A large number of color patches are printed on the recording medium (for example, sheet) by giving the test data of Y, M, C (for example, 5×5×5) from the test chart data section 13 to the printer section 11. These color patches are color-measured by the calorimeter 14. The calorimeter outputs tristimulus values of X, Y, Z, and the values obtained in this manner are converted into the color system (for example, L*a*b*, L*u*v*). In this manner, when it is plotted in another color system (for example, the uniform color space), the space as shown in FIG. 5(b) is formed. The characterization data, where Y, M, C data are converted into the color system, are stored in the characterization data memory device 16.

When the characterization data is obtained, by conducting the processing described about FIG. 5(a) to FIG. 5(d), the color conversion LUT (color matching table) of the printer is made by the LUT forming apparatus 12.

(The Normal Print Operation)

By the above processing, when the color conversion LUT (color matching table) is made, the input image data enters into the color conversion apparatus 10, and the color conversion is conducted by using the color conversion LUT (color matching table). The image data into which the color conversion is conducted, is printed in the printer section 11, and the image on which the preferable color reproduction is performed, is printed.

(The Calibration Operation)

On the intermediate way of the operation, when the characteristic of the printer section 11 is changed, it is necessary that the new color conversion LUT (color matching table) is made by the method of the present invention. In this case, the color patches are printed by inputting the data more thinned out than that at the time of the characterization into the printer section 11 from the test chart data section 13. This color patch (test chart) is color-measured by the calorimeter 14 and stored in the calibration data memory device 15.

The LUT forming apparatus 12 combines the data stored in the calibration data memory device 15 with the data stored in the characterization data memory device 16, and the deviation Sxp and the new coordinate value $New_{xp}$ are obtained from the expression (1) and the expression (2). When the new coordinate value $New_{xp}$ is obtained by the expression (1) and the expression (2), for also the thinned-out data, the characteristic as shown in FIG. 3 of the interpolated color system series is obtained. Since the data of such a color system series is obtained, the color conversion LUT (color matching table) is made by the method described in FIG. 5(a) to FIG. 5(d) in the LUT forming apparatus 12.

In the manner as described above, when the calibration is completed, the actual image data to be inputted from the device is inputted this time, and the sequence becomes the print operation to be conducted in the printer section 11. When the memory medium is the cloth, because the color conversion LUT (color matching table) is different depending on the characteristic of the cloth, when the color conversion LUT (color matching table) is prepared for each necessary cloth, these LUTs can be switched corresponding to the kind of the cloth and used, and the color variation due to the kind of the cloth can be effectively corrected. In this case, after the second cloth, the number of points of the colorimetry can be reduced.

In the above embodiment, although the case of 3 colors is shown, the case more than 4 colors can also be conducted in the same manner. As the number of colors is increased, because the variation factors of respective colors are increased, the present invention is more effective, of course, for the case of one color (monochrome), it can also be used.

Particularly, when the medium is the cloth, there are various cases depending on the pre-treatment, the kind of the ink, or the kind of the cloth, and because the color reproduction table can be made without conducting all of the colorimetry, it greatly contributes to the reduction of the working amount of the user.

In the hifi color ink, there is the ink having the large variation or small variation depending on the kind of the ink. In this case, for only the color having the large variation, the calibration operation can also be conducted.

Further, when the data of the characterization is made a form which is attached to the finally made table or which refers to its data name, the processing which is conducted later becomes easy. For example, in the ICC (International color consortium) form, although there is a table to print-output from L*a*b*, and a table which is converted into L*a*b* from the printer output value, the original data to make them is in the other place. For example, as this data, the calorimetric value of ANSI IT 8.7/3 target is attached as it is, and it may also be corrected by the result measured by thinning-out it. When the calorimetric value of ANSI IT 8.7/3 is a value registered on the internet, it may also only refer to the proper number (code) or URL.

In the above embodiment, although the case where the sequence of the color reproduction table making is conducted by the respective hardware, is described, the memory medium in which these processing sequences are stored as the software may be used. When the memory medium is used and the sequence of the color conversion table making is conducted by the general purpose computer, although the processing speed is a little lowered, the hardware amount is greatly reduced.

According to the structure (1), a large number of colorimetry are not conducted, and the variation error due to the variation of the primary color points can be effectively corrected by a small number of the colorimetry points.

According to the structure (2), for the colorimetry point, the calibration data can be used as it is, and the error is reduced.

According to the structure (3), when the color calibration is conducted at need, the working burden of the user can be lightened.

According to the structure (4), although the color is varied due to the various factors in the print onto the cloth, the color variation can be effectively corrected.

According to the structure (5), the variation error due to the variation of the primary color points can be effectively corrected by a small number of colorimetry points, without conducting a large number of colorimetry.

According to the structure (6), the memory medium in which the sequence to conduct the color calibration is stored can be provided, and the hardware amount can be reduced.

As described above, according to the present invention, a calibration method of the printer by which the variation amount of the printer (or media) is absorbed by the minimum additional colorimetry and the correct color reproduction can be conducted, a calibration apparatus, and a memory medium in which the calibration method is stored, can be provided.

What is claimed is:

1. A calibration method of a printer, comprising:
   (1) forming characterization data using first colorimetric data obtained from a first set of color patches outputted from the printer;
   (2) forming calibration data using second colorimetric data obtained from a second set of color patches having a smaller number of color patches than the first set of color patches, wherein the second set of color patches is a subset of the first set of color patches and comprises color patches remaining after thinning out the first set of color patches;
   (3) forming a color matching table by applying an interpolation calculation to the calibration data using the characterization data; and
   (4) converting color image data based on the color matching table.

2. The calibration method of a printer cited in claim 1, wherein the steps (2), (3) and (4) are conducted when at least one of an ink and a medium for the printer is changed.

3. The calibration method of a printer cited in claim 1, wherein a medium for the printer is made of cloth.

4. A calibration apparatus for a printer, comprising:
   a characterization data memory section which stores characterization data formed by using first colorimetric data obtained from a first set of color patches outputted from the printer;
   a calibration data memory section which stores calibration data formed by using second colorimetric data obtained from a second set of color patches having a smaller number of color patches than the first set of color patches, wherein the second set of color patches is a subset of the first set of color patches and comprises color patches remaining after thinning out the first set of color patches;
   a color matching table forming section which forms a color matching table by applying an interpolation calculation to the calibration data using the characterization data; and
   a color conversion section which converts color image data based on the color matching table.

5. A computer-readable storage medium having a program stored thereon that is executable by computer to cause the computer to perform a calibration procedure, the calibration procedure comprising:
   (1) forming characterization data using first colorimetric data obtained from a first set of color patches outputted from the printer;
   (2) forming calibration data using second colorimetric data obtained from a second set of color patches having a smaller number of color patches than the first set of color patches, wherein the second set of color patches is a subset of the first set of color patches and comprises color patches remaining after thinning out the first set of color patches;
   (3) forming a color matching table by applying and interpolation calculation to the calibration data using the characterization data; and
   (4) converting color image data based on the color matching table.

* * * * *